(12) United States Patent
Kumagai

(10) Patent No.: US 7,195,362 B2
(45) Date of Patent: Mar. 27, 2007

(54) LIGHT EMITTING DEVICE AND ELECTRONIC APPARATUS

(75) Inventor: Keiichirou Kumagai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 11/222,740

(22) Filed: Sep. 12, 2005

(65) Prior Publication Data

US 2006/0077649 A1 Apr. 13, 2006

(30) Foreign Application Priority Data

Sep. 29, 2004 (JP) .............................. 2004-284379

(51) Int. Cl.
*F21V 9/02* (2006.01)
(52) U.S. Cl. .......................... 362/12; 362/17; 362/248
(58) Field of Classification Search .................... 362/8, 362/11, 12, 17, 228, 230, 240, 184, 196, 200, 362/248; 396/201–203, 182
See application file for complete search history.

(56) References Cited

U.S. PATENT DOCUMENTS

| | | | | |
|---|---|---|---|---|
| 6,682,211 B2 * | 1/2004 | English et al. | ............... | 362/545 |
| 6,786,627 B2 * | 9/2004 | Takagi et al. | ............... | 362/555 |
| 6,847,783 B2 * | 1/2005 | Sasaki et al. | ................. | 396/30 |
| 7,117,011 B2 * | 10/2006 | Makino | .................... | 455/556.1 |
| 7,136,672 B2 * | 11/2006 | Kitano et al. | ............ | 455/556.1 |
| 2003/0031010 A1 * | 2/2003 | Sosniak et al. | ............. | 362/140 |
| 2005/0107118 A1 | 5/2005 | Makino | | |

FOREIGN PATENT DOCUMENTS

| | | |
|---|---|---|
| EP | 1 469 671 | 10/2004 |
| JP | 2003-333155 | 11/2003 |
| JP | 2004/252469 | 9/2004 |
| WO | WO-03/081902 | 10/2003 |

OTHER PUBLICATIONS

European Search Report issued Apr. 3, 2006.

* cited by examiner

*Primary Examiner*—Renee Luebke
*Assistant Examiner*—Zahra I. Bennett
(74) *Attorney, Agent, or Firm*—Dickstein Shapiro LLP

(57) ABSTRACT

Provided is an electronic apparatus including: a camera, which picks up an image of a subject, arranged in a main body of the apparatus; a first light source which emits first light in conjunction with a flash of the camera; a second light source which emits second light for indicating status regarding various functions; a single lens arranged toward a light-outgoing side of the first and second light sources; and a housing portion which, as well as supporting the lens, houses the first and second light sources.

14 Claims, 13 Drawing Sheets

LIGHT EMITTING DEVICE AND ELECTRONIC APPARATUS

BACKGROUND OF THE INVENTION

1. Field of the Invention

The present invention relates to a light emitting device and to an electronic apparatus, and more specifically relates to a light emitting device provided with a plurality of light sources and to an electronic apparatus provided with the light emitting device.

2. Description of the Related Art

Electronic apparatuses such as a mobile terminal in recent years indicate call arrival as well as including built-in cameras provided with a flashing function. For this purpose, in the above mobile terminal, a light source for flashing and a light source for call arrival are arranged at a plurality of locations. On the other hand, for mobile electronic apparatuses, miniaturization and cost reduction are also highly demanded.

Since the light sources for flashing and for call arrival have respectively different purposes, it is preferable to prepare the light sources suited for the respective purposes and to arrange them at locations suited for the respective purposes. FIGS. 10 to 13 are views showing a mobile terminal in which the above light sources are arranged at plural locations. FIG. 10 is a plan view showing a plurality of light sources arranged in a housing of the mobile terminal. FIG. 11 is a disassembled perspective view of the mobile terminal shown in FIG. 10. FIG. 12 is a cross-sectional view taken along a line III—III in FIG. 10, and FIG. 13 is a cross-sectional view taken along a line IV—IV in FIG. 10.

As shown in FIGS. 11 and 12, a mobile terminal 100 is provided with a camera unit 112 and a circuit substrate 107 between a front case 101 and a rear case 102. As shown in FIG. 11, on the circuit substrate 107, an LED 108 for call arrival and an LED 109 for flashing are mounted symmetrically with respect to a display 110.

As shown in FIG. 12, a lens 106 is arranged in the rear case 102 by means of a cylindrical lens-supporting part 105. As shown in FIG. 13, a lens 103 is arranged in the rear case 102 by means of a cylindrical lens-supporting part 104. Here, light respectively from the LED 108 for call arrival and from the LED 109 for flashing are separately irradiated through the lens 103 and the lens 106.

In the example in FIG. 10, while mounting regions are required for the respective light sources, parts such as lenses are required. Consequently, while miniaturization of the mobile terminal becomes difficult, parts increase in number.

Meanwhile, among the conventional mobile terminals, there have been proposed a type having a light source which serves as the above light sources for both call arrival and flashing (refer to Japanese Patent Application Laid-open No. 2003-333155). For example, in an invention according to Japanese Patent Application Laid-open No. 2003-333155, light emitting diodes of R (red), G (green) and B (Blue) are employed as a light source.

Incidentally, purposes are different between the light sources for call arrival and for flashing. Therefore, light volume, light colors, light emitting positions, irradiation angles and the like are different therebetween. In the invention according to Japanese Patent Application Laid-open No. 2003-333155 or the like, it is hence required to adjust the light strength and the like with respect to each purpose.

SUMMARY OF THE INVENTION

In view of the foregoing and other exemplary problems, drawbacks, and disadvantages of the conventional structures, an exemplary feature of the present invention is to provide a light-emitting device and an electronic apparatus which provide a plurality of light sources with a simple structure.

In order to achieve the above exemplary feature of the present invention, there is provided a light emitting device, including: a first light source which emits first light, a second light source which emits second light, a single lens arranged toward a light-outgoing side of the first and second light sources, and a housing portion which, as well as supporting the lens, houses the first and second light sources.

In order to achieve the above exemplary feature of the present invention, there is provided an electronic apparatus, including: a camera which picks up an image of a subject, arranged in a main body of the apparatus, a first light source which emits first light in conjunction with a flash of the camera, a second light source which emits second light for indicating status regarding various functions, a single lens arranged toward a light-outgoing side of the first and second light sources, and a housing portion which, as well as supporting the lens, houses the first and second light sources.

In order to achieve the above exemplary feature of the present invention, there is provided an electronic apparatus, including: a first housing provided with a camera which picks up an image of a subject, a second housing attached to the first housing through an open/close unit, a first light source which emits first light in conjunction with a flash of the camera, a second light source which emits second light for indicating status regarding various functions, a single lens arranged toward a light-outgoing side of the first and the second light sources, and a housing portion which, as well as supporting the lens, houses the first and the second light sources.

According to the present invention, the housing portion supports a single lens arranged toward a light-outgoing side of a first light source and a second light source, and houses the first and the second light sources. Therefore, it becomes possible to provide a plurality of light sources with a simple structure.

DESCRIPTION OF THE EXEMPLARY EMBODIMENTS (First Exemplary Embodiment)

Hereinafter, based on FIGS. 1 to 6, a mobile terminal 10 with a built-in camera of a foldable type will be explained as an electronic apparatus of a first preferred exemplary embodiment of the present invention.

(Structure of the Mobile Terminal)

Figure 1:
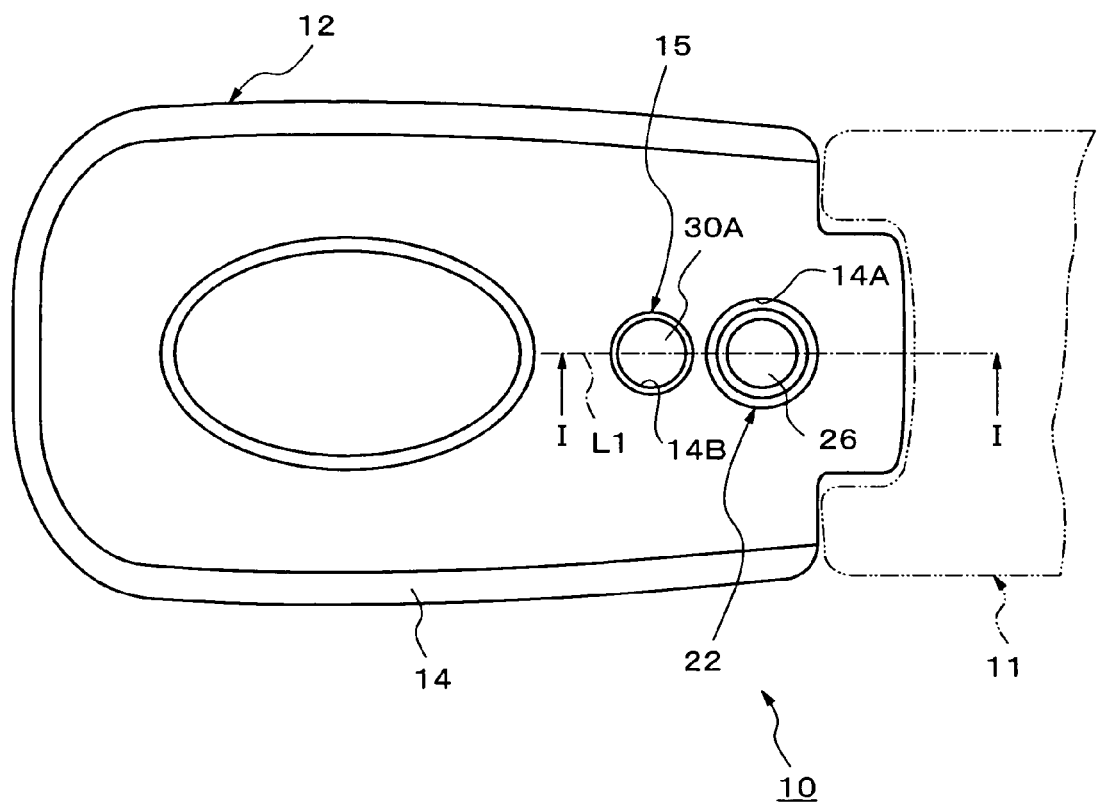
FIG. 1 is a plan view showing a plurality of light sources arranged in a housing of a mobile terminal according to a first exemplary embodiment of the present invention.

As shown in FIG. 1, in the mobile terminal 10, a first housing 11 indicated by an imaginary line in FIG. 1 and a second housing 12 indicated by a solid line in FIG. 1 are linked with each other by means of a hinge (not shown) as an open/close means (open/close unit). In the first housing 11, for example, a plurality of operation keys not shown are, or a microphone not shown is arranged. In the second housing 12, a camera unit 22, a first display 24 (refer to FIG. 2) or the like is arranged. Note that the camera unit 22 is arranged relatively near to the hinge (in FIG. 1, on the right side) in the second housing 12.

Figure 3:
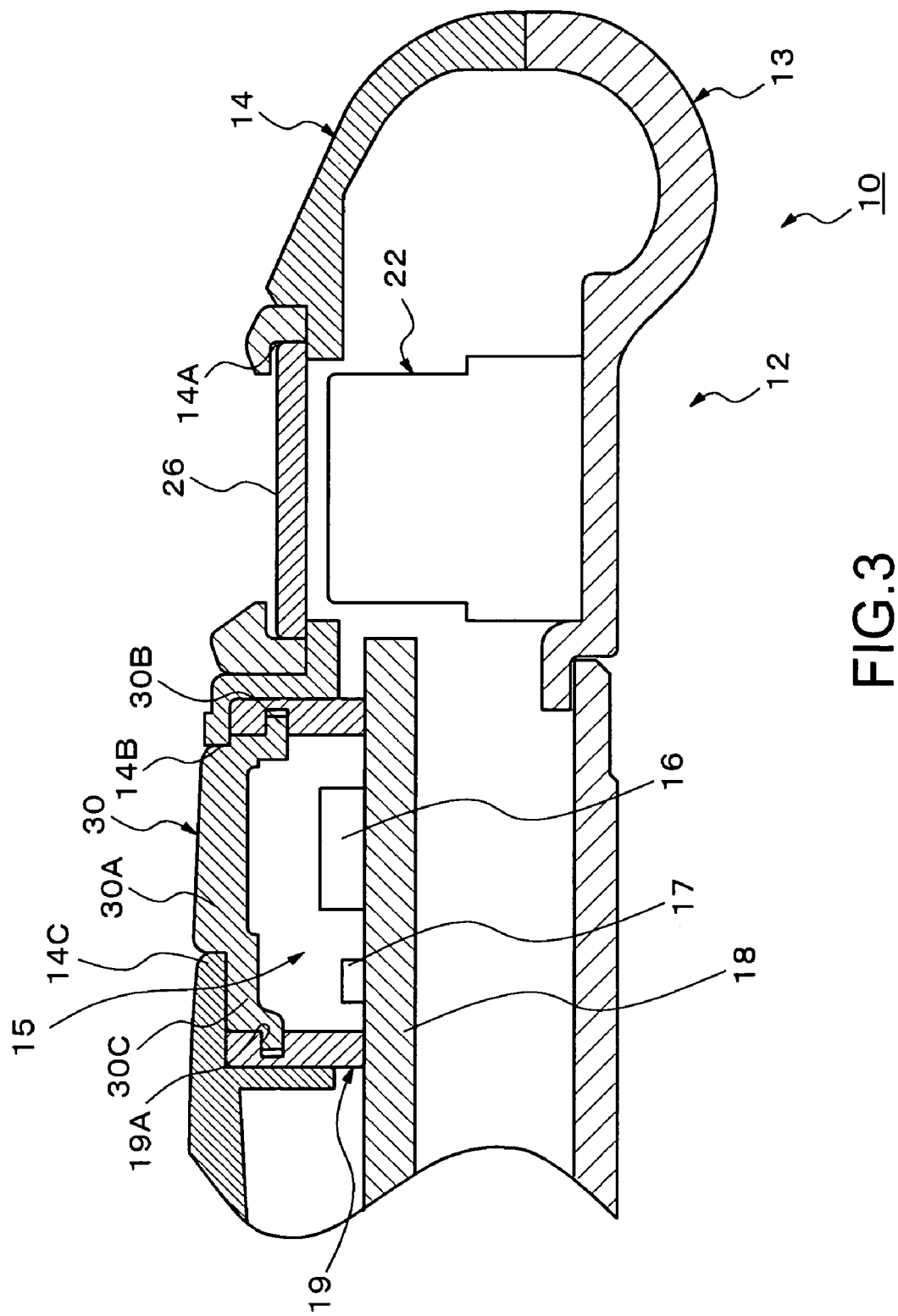
FIG. 3 is a cross-sectional view taken along a I—I line in FIG. 1.

As shown in FIG. 3, the second housing 12 includes a first case 13 onto which a second display (not shown) is mounted, and a second case 14 onto which a light source unit 15 is mounted. The light source unit 15 is arranged on the left side of (nearer to the center of the second housing 12, in a longitudinal direction) the camera unit 22. Additionally, in the second case 14, round holes 14A and 14B are formed in positions corresponding respectively to a camera lens (not shown) of the camera unit 22 and to the light source unit 15.

Moreover, the camera unit 22 and the light source unit 15 are arranged on a centerline L1 (see FIG. 1). The centerline L1 is the center of the second housing 12, shown in FIG. 1, in a longitudinal direction of the second housing 12. That is, both the camera lens (not shown) of the camera unit 22 and light sources 16 and 17 of the light source unit 15, are positioned on the same centerline L1. Additionally, an image is picked up by using the camera unit 22 as shown in FIG. 1, while the mobile terminal 10 is held by hand, for example, in a manner that the light source unit 15 is positioned above the camera unit 22.

Figure 2:
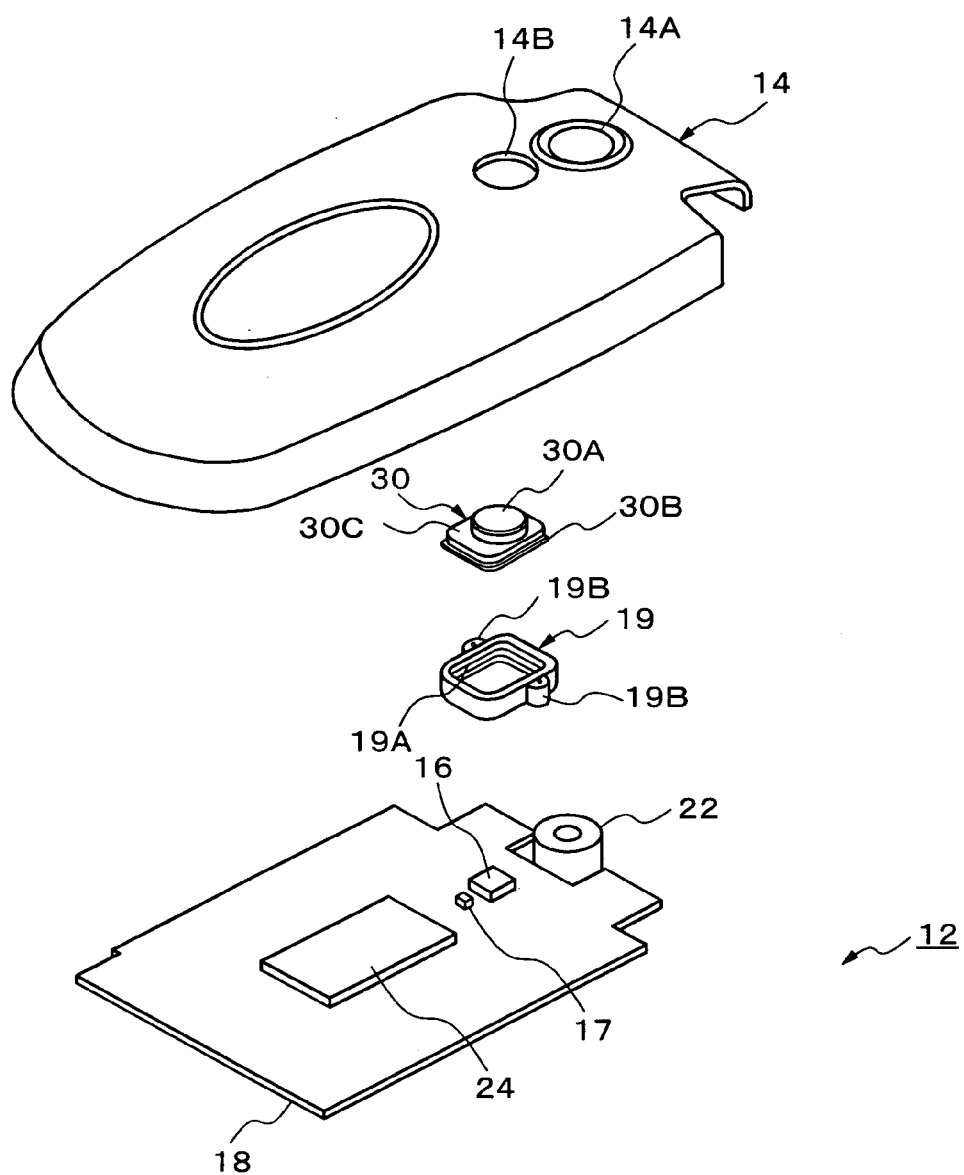
FIG. 2 is a disassembled perspective view showing a main portion of the mobile terminal shown in FIG. 1.

As shown in FIGS. 2 and 3, the light source unit 15 is provided with the first and the second light sources 16 and 17. The first and second light sources 16 and 17 are mounted on a flat circuit substrate 18 and located in close to each other. The first light source 16 is an LED which emits flash light when the camera picks up an image. For the first light source 16, a white light emitting diode, for example, is employed.

The second light source 17 is an LED for status indication with respect to various functions, that is, for example, an LED for call arrival notifying a user that communication is received. For this LED, one whose light volume is smaller than that of the white light emitting diode is employed, the one being, for example, a blue light emitting diode or an LED with the three colors R (red), G (green) and B (Blue). Note that, to each of the light sources 16 and 17, any member other than an LED can be applied as long as the member emits light having a predetermined light volume.

Figure 4:
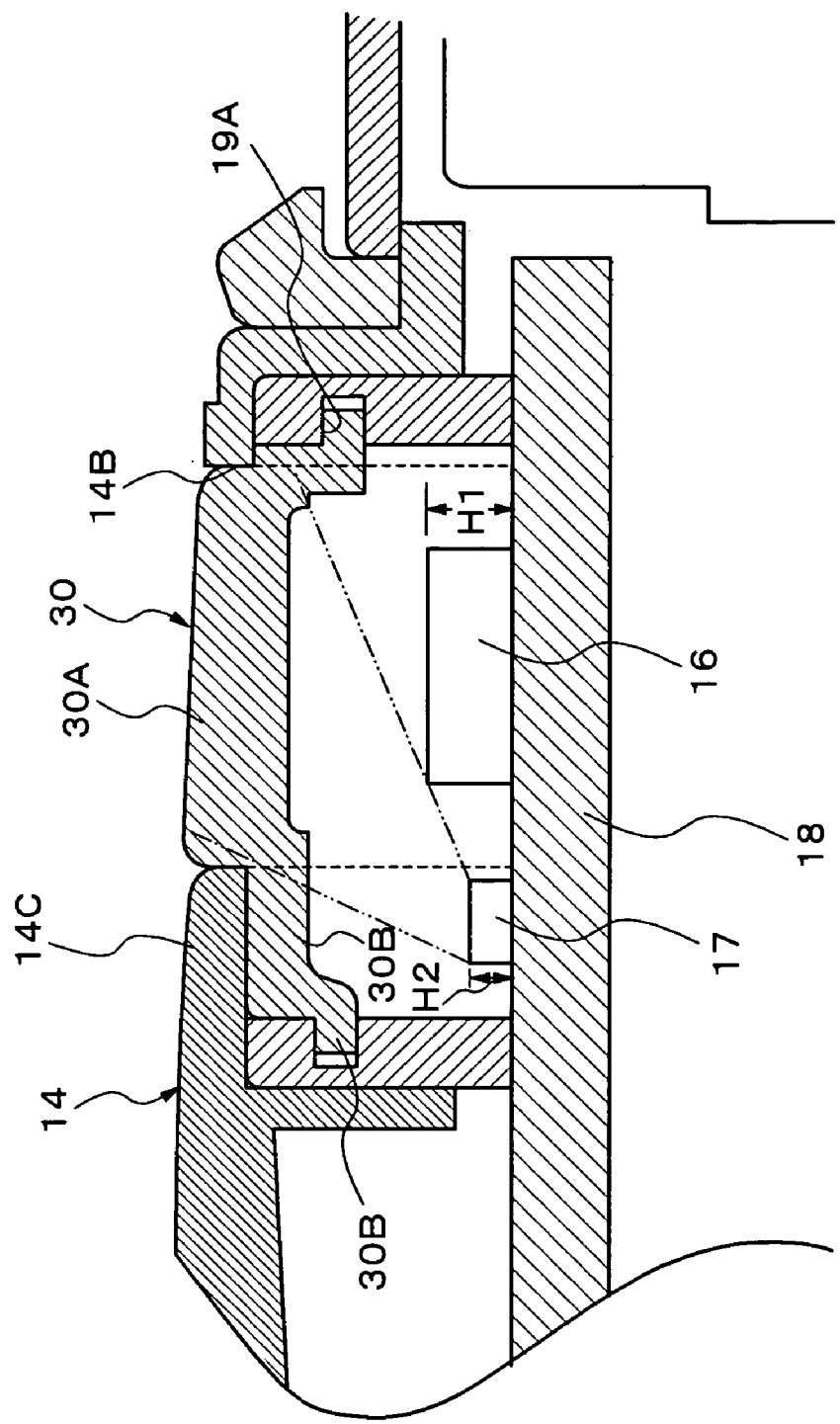
FIG. 4 is an enlarged view of a main portion shown in FIG. 3.

Moreover, the first light source 16 is larger than the second light source 17, and as shown in FIG. 4, a thickness (height) H1 of the first light source 16 is thicker than a thickness H2 of the second light source 17. Note that the circuit substrate 18 and the camera unit 22 are embedded between the first case 13 and the second case 14.

As shown in FIGS. 2 and 3, a substantially angular-cylindrical housing frame 19 is supported in a state where it is interposed between the second case 14 and the circuit substrate 18. The housing frame 19 as a housing portion has a rectangular planar shape such that it encloses the first and second light sources 16 and 17. Here, the housing frame 19 completely encloses the first and second light sources 16 and 17 and thereby forms a hollow closed space (light guiding space).

On a relatively upper portion (a section relatively apart from the circuit substrate 18) of the inner peripheral surface of the housing frame 19, a groove 19A is formed in a manner that it follows a direction of a periphery of the housing frame 19. Note that, as shown in FIG. 2, attachment portions 19B, on each of which a hole is formed, are formed as a pair in a symmetric fashion on the housing frame 19. Here, the housing frame 19 is attached to the second case 14 by means of the attachment portions 19B and the like.

A lens 30 is provided with a round lens portion 30A and a flange 30B. The flange 30B is formed from an outer periphery of the lens 30 toward an outward direction thereof. Here, the lens 30 is supported on the housing frame 19 by fitting the flange 30B of the lens 30 into the groove 19A of the housing frame 19. Note that the lens 30 is molded of a material capable of evenly guiding light, examples of which include a opalescent material and a material containing a diffusing agent.

As shown in FIG. 3, the lens portion 30A is arranged in a manner that it faces the first light source 16. Moreover, the lens portion 30A is arranged in a manner that the lens portion 30A and the first light source 16 are concentric. On the other hand, on the lens 30, a step portion 30C is formed on a section facing the second light source 17.

Moreover, in a state where the lens 30 is fit into a hole 14B of the second case 14, the step portion 30C faces to a periphery (blocking portion) of the second case 14, the periphery defining the hole 14B. Consequently, a transmitting region of the lens 30 corresponding to the light sources 16 and 17 is only the lens portion 30A, and does not include the step portion 30C. On the other hand, as shown in FIG. 4, the second light source 17 is configured in order that light from the second light source 17 can be diagonally directed so as to head for the lens portion 30A of the lens 30, and can be directly transmitted through the lens portion 30A (refer to a dashed double-dotted line in FIG. 4).

Note that, as shown in FIG. 3, a lens 26 is fit into a hole 14A of the second case 14 in order that it faces an imaging lens (not shown) of the camera unit 22.

(Effects of the Exemplary Embodiment)

Figure 5:
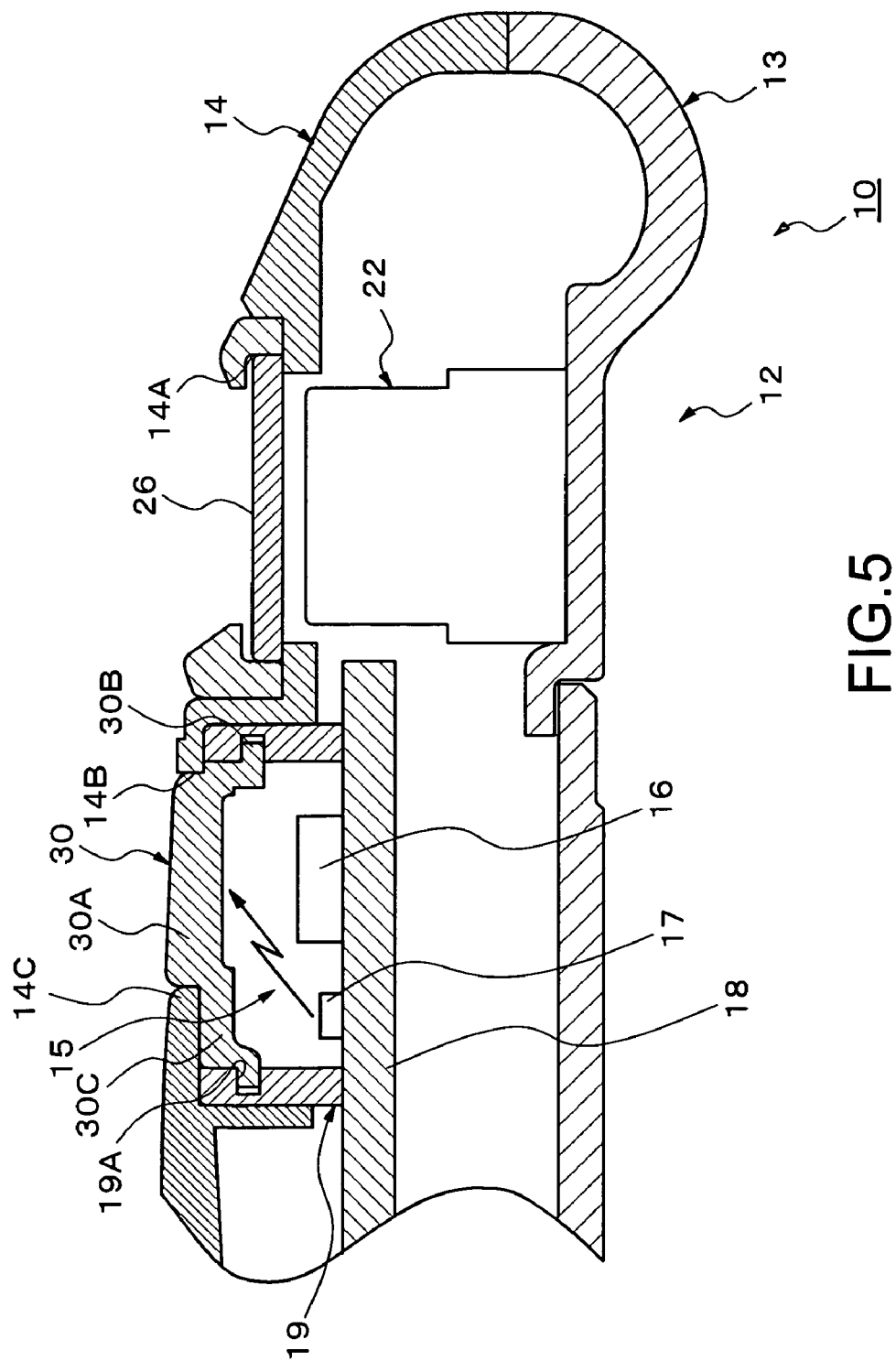
FIG. 5 is a view explaining light outgoing from a second light source shown in FIG. 3.

First, based on FIG. 5, light emission, for example, on the occasion of call arrival or on other occasions will be explained. When the mobile terminal 10 receives commu nication, a light emitting surface 17A of the second light source 17 emits light. When the second light source 17 emits light, light from the second light source 17 is efficiently guided toward lens portion 30A of the lens 30 by means of the housing frame 19.

Additionally, in this exemplary embodiment, since the second light source 17 is arranged in order that light from the second light source 17 can directly go out toward the lens portion 30A (transmitting region) of the lens 30, light from the second light source 17 can be efficiently illuminated toward the lens portion 30A.

Specifically, light from the second light source 17 is diagonally directed so as to head for a lens surface 30D of the lens portion 30A, and is directly transmitted through the lens portion 30A. Consequently, light emission of the second light source 17 is easily recognized visually, for example, even from a curved-surface edge portion in the second case 14. For example, even when the mobile terminal 10 is held in an pocket or the like (not shown) in a state where the mobile terminal 10 is folded and where its side including hinge faces an opening of the pocket or the like, light from the second light source 17 can be directly irradiated to the lens portion 30A, whereby visual recognition of the light emission becomes favorable.

Note that, in this exemplary embodiment, by arranging the step portion 30C in a manner making it overlapped with a peripheral wall 14C of the second case 14, the second light source 17 is not directly viewed through the step portion 30C facing the second light source 17. Consequently, the second light source 17 during light emission is not viewed directly through the step portion 30C of the lens 30, and therefore does not appear just like a so-called eye ball.

Figure 6:
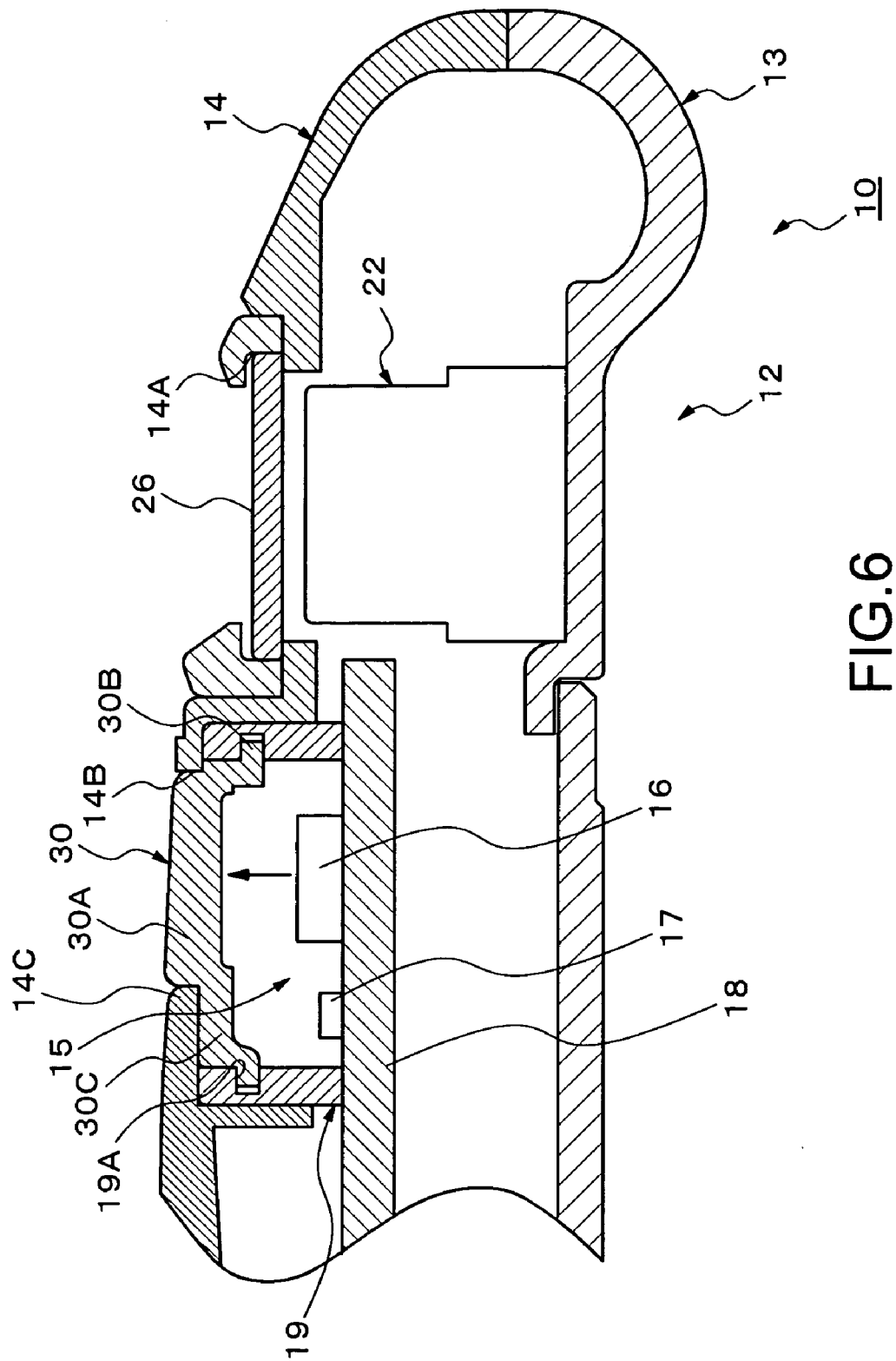
FIG. 6 is a view explaining light outgoing from a first light source shown in FIG. 3.

Next, based on FIG. 6, a description will be given of operations and the like when the camera embedded in the mobile terminal 10 picks up an image. As shown by the imaginary line in FIG. 1, after the mobile terminal 10 is unfolded, an image pick-up key (not shown) arranged in a first housing 11 is operated (pressed). When a control unit (CPU) (not shown) judges that the first light source 16 is needed to be flashed, the first light source 16 emits light.

When a light emitting surface 16A of the first light source 16 emits light, light from the first light source 16 arranged on an optical axis common with the lens portion 30A is efficiently guided toward the lens portion 30A by means of the housing frame 19. Therefore, light from the first light source 16 directly irradiates a subject (target object).

According to the exemplary embodiment, by providing the housing frame 19, the plurality of light sources 16 and 17 can be provided with a simple structure. The housing frame 19 supports a single lens 30 arranged toward a light-outgoing side of the first and second light sources 16 and 17, and houses the first and second light sources 16 and 17.

Additionally, in a case where the mobile terminal 10 is held in a manner that the light source unit 15 is positioned above the camera unit 22, even when a so-called "shadow (of a subject)" is imaged, for example, on a wall behind the subject, a picked-up image is not unnatural because the above shadow appears in a downward direction.

Note that, in the exemplary embodiment, the second light source 17 may be allowed to emit light in various irradiation patterns (for example, various time intervals, various emitted colors, or the like) to display accumulation of unread mails or the like, reception of a recorded message, a conversation status, a battery status and the like. Additionally, in a case where the first light source 16 emits light insuffi ciently in light volume, the second light source 17 may be allowed to emit light in addition to the first light source 16. On the other hand, the first light source 16 may be allowed to emit light in place of the first light source 17.

(Second Exemplary Embodiment)

Figure 7:
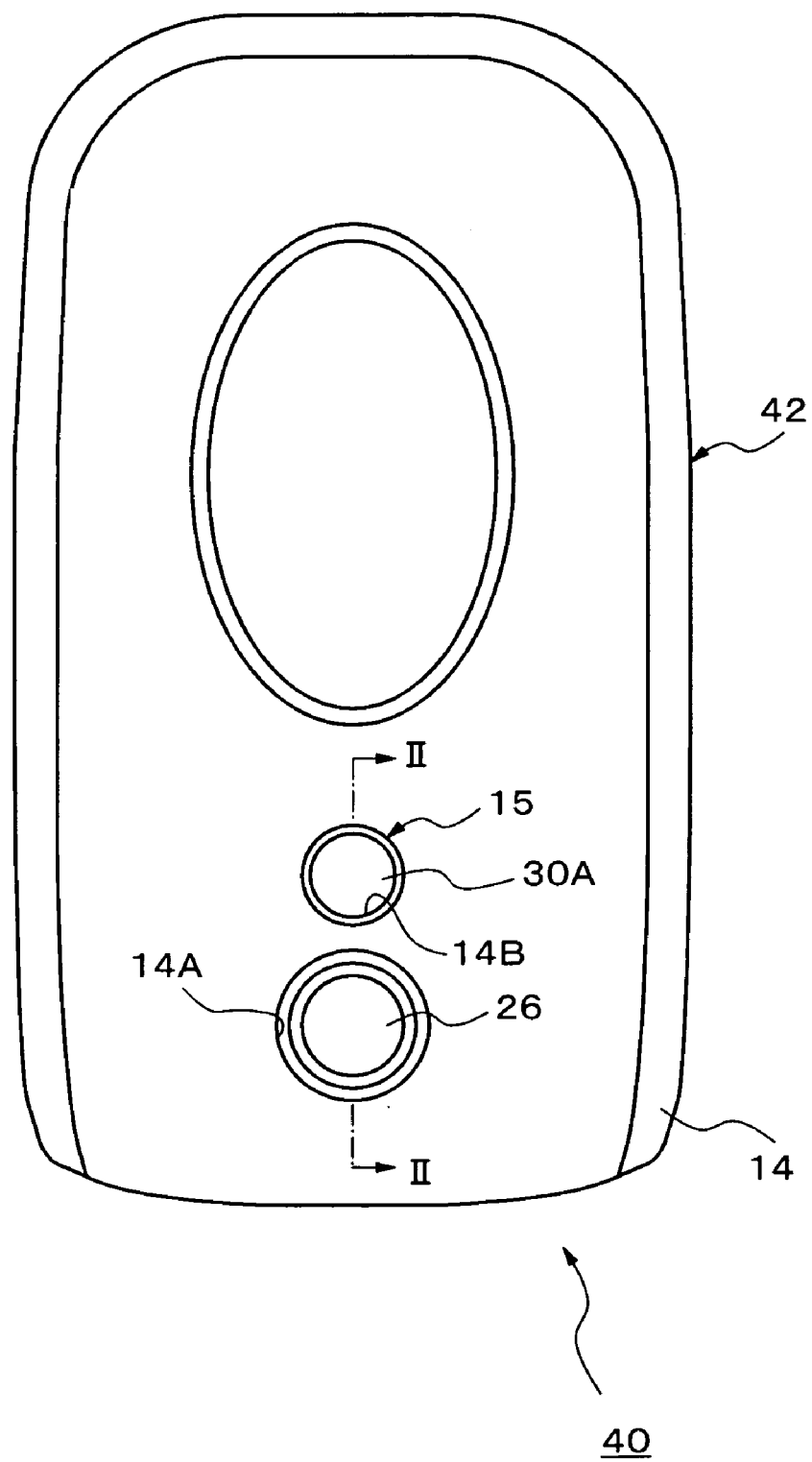
FIG. 7 its a plan view showing a plurality of light sources arranged in a housing of a mobile terminal according to a second exemplary embodiment of the present invention.
Figure 8:
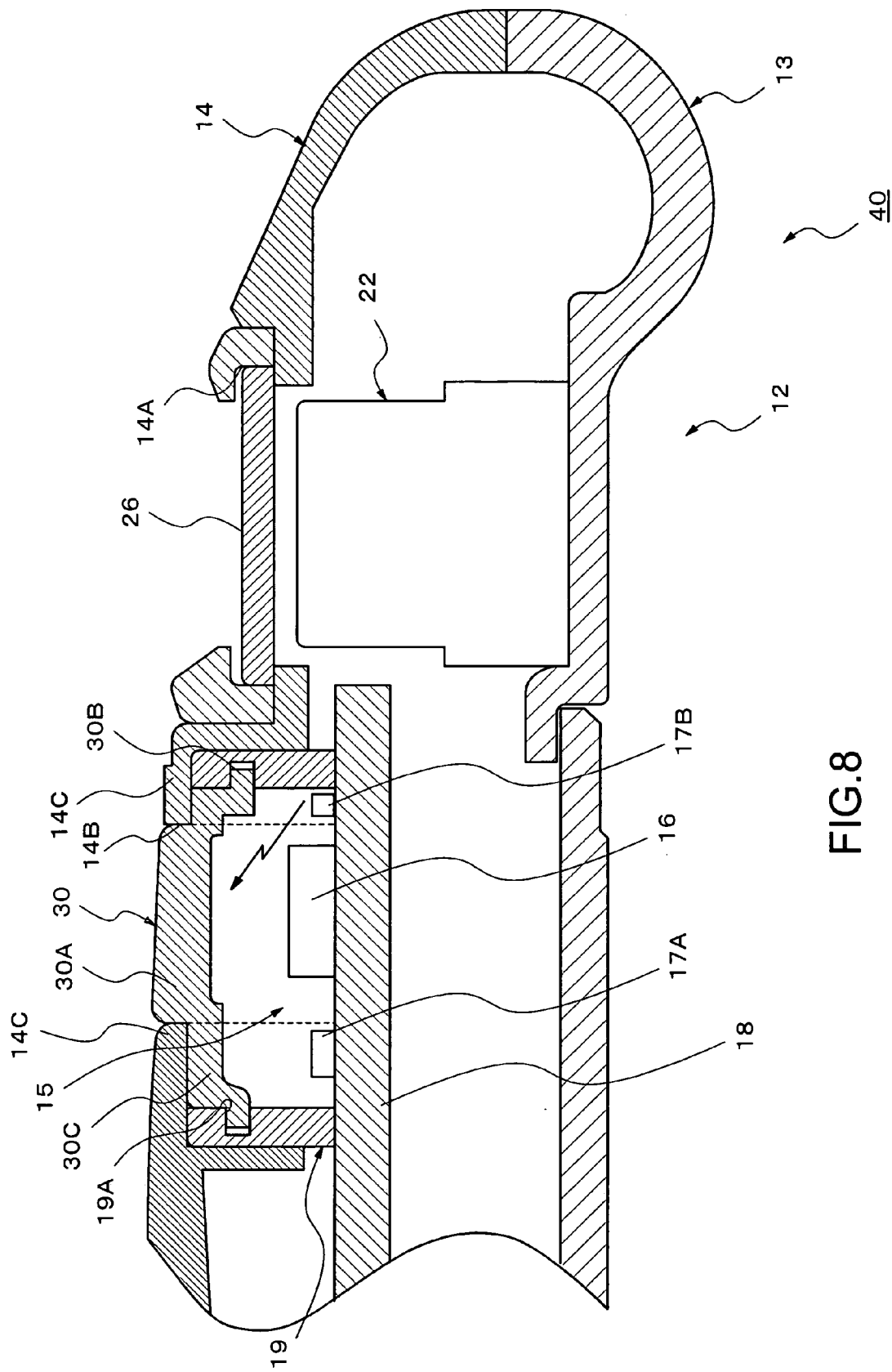
FIG. 8 is a cross-sectional view taken along a II—II line in FIG. 7.

In FIGS. 7 and 8, a second exemplary embodiment of the present invention is shown. A mobile terminal 40 in this exemplary embodiment is a type structured only with a single housing 42 (refer to FIG. 7). Note that, as to a structure of the mobile terminal 40 in this exemplary embodiment, portions in FIG. 7 which correspond to those in FIG. 1 are denoted by the same reference numerals, and detailed descriptions thereof will be omitted.

As shown in FIG. 8, this exemplary embodiment is an example in which light sources to be arranged in the housing frame 19 are multiple, that is, three for example. Second light sources 17A and 17B are arranged symmetrically with respect to the first light source 16 as a pair. The second light sources 17A and 17B are set up so as to emit light, for example, of different colors respectively.

Figure 10:
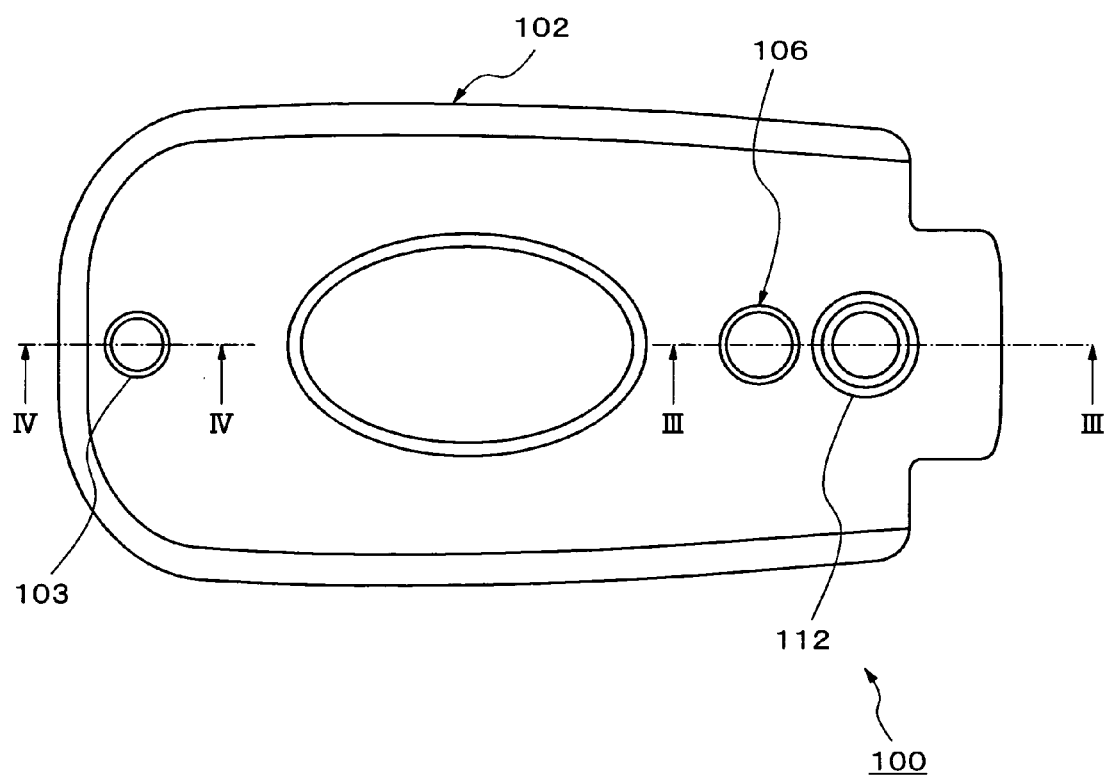
FIG. 10 is a plan view showing a plurality of light sources arranged in a housing of a mobile terminal in a conventional example.
Figure 11:
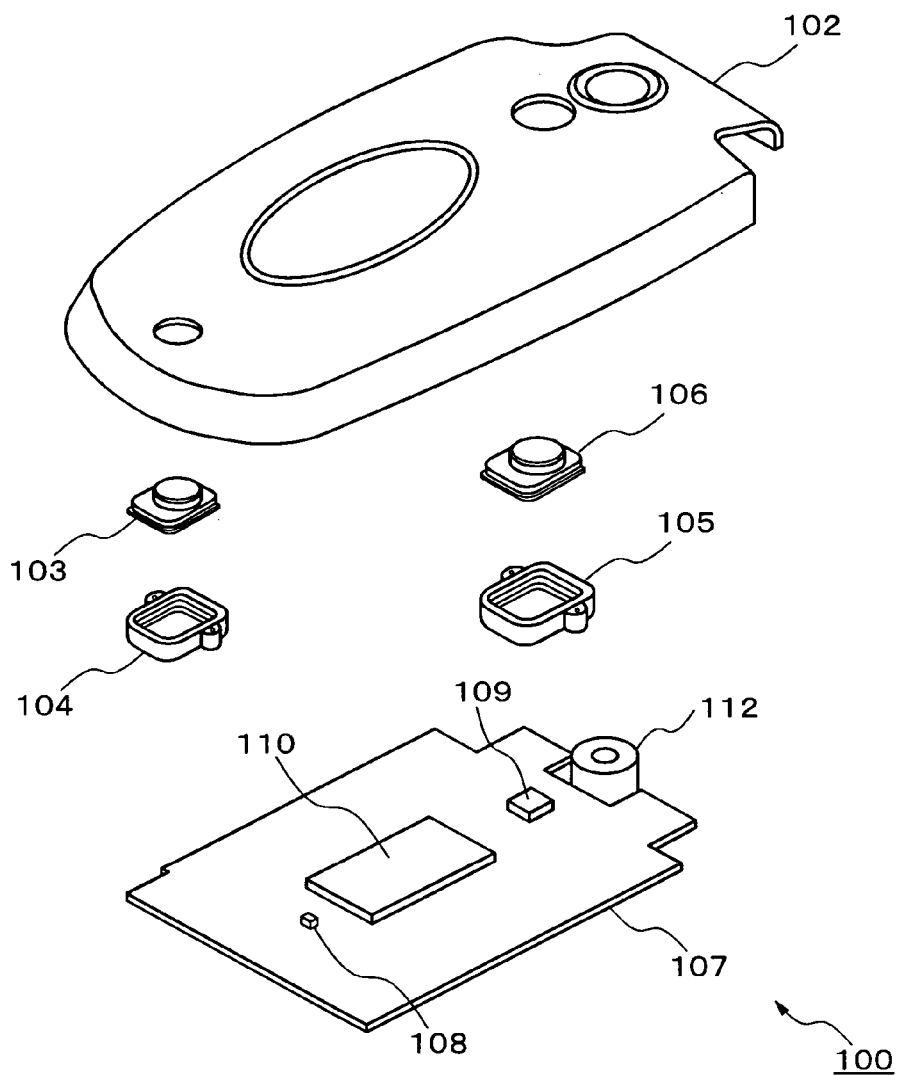
FIG. 11 is a disassembled perspective view showing a main portion of the mobile terminal shown in FIG. 10.
Figure 11:
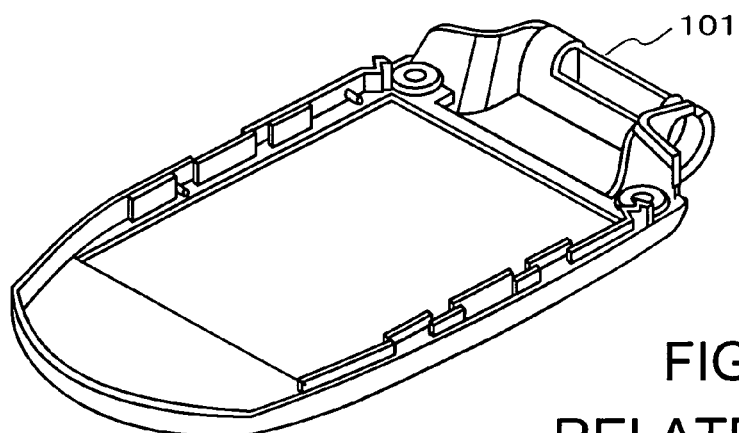
Figure 12:
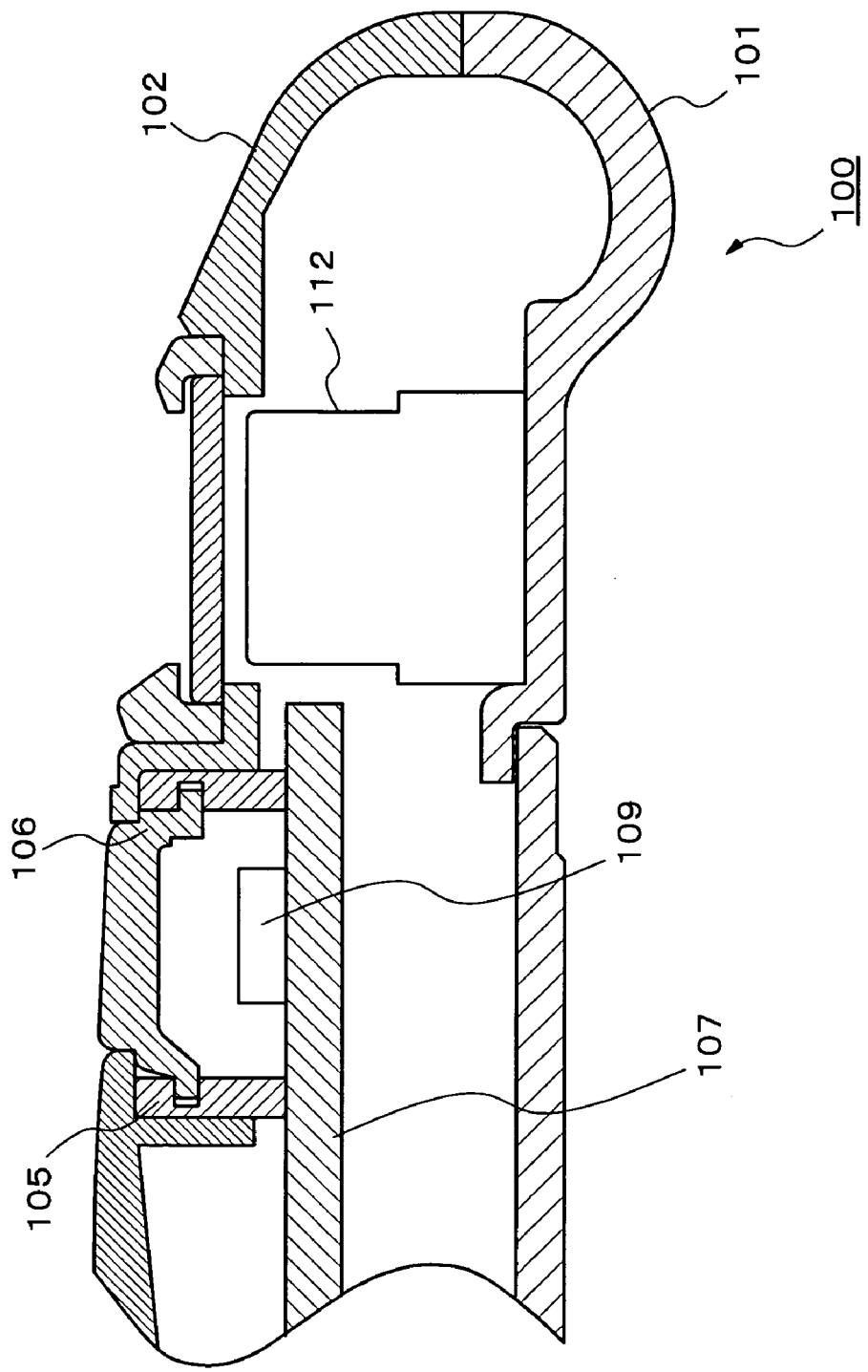
FIG. 12 is a cross-sectional view taken along a III—III line in FIG. 10.
Figure 13:
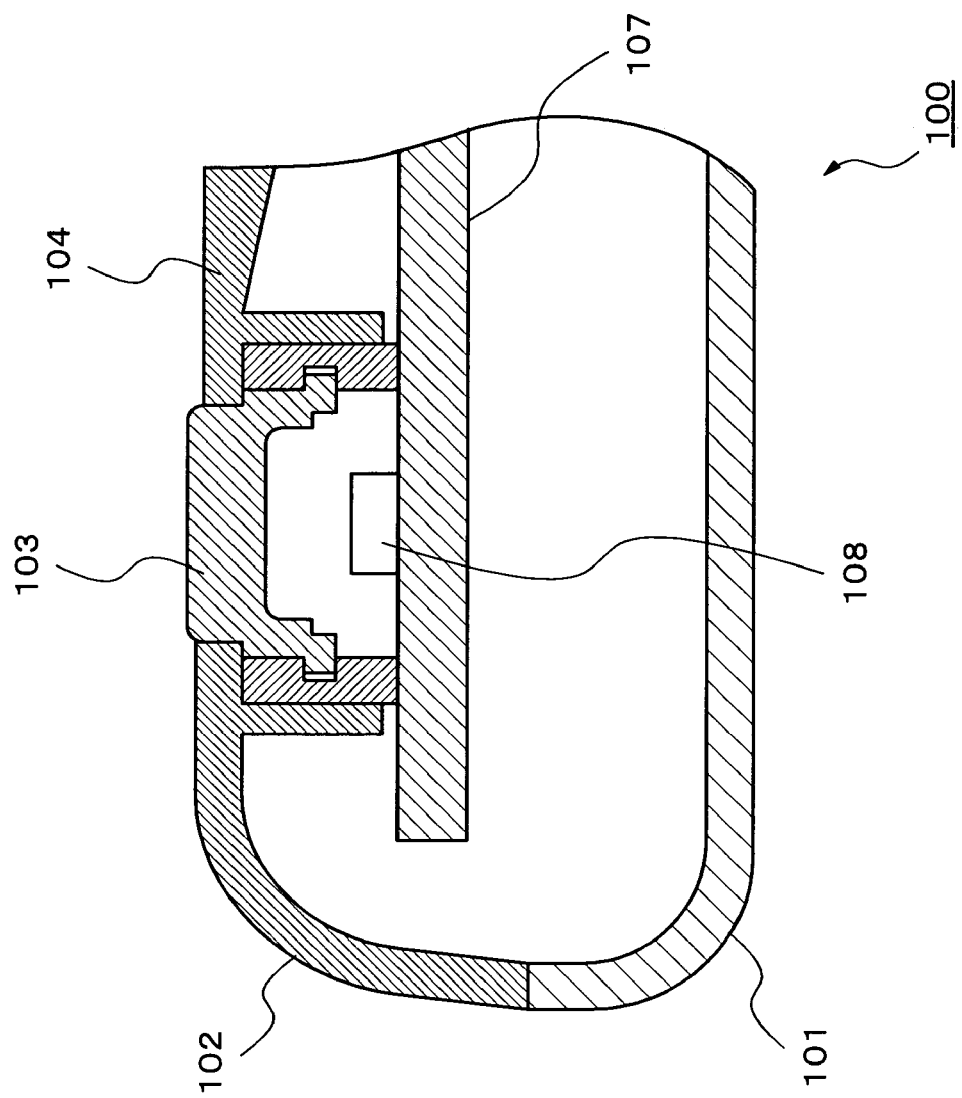
FIG. 13 is a cross-sectional view taken along a IV—IV line in FIG. 10.

In the present invention, it is possible to illuminate, through one lens 30, the first light source 16 for flashing and the second light source 17 (17A or 17B) for indicating status regarding various functions. Consequently, as compared to, for example, the conventional case shown in FIG. 10, it is possible to save a space as well as to reduce a number of parts. Other structures, and other operation effects regarding the light source unit 15 and the camera unit 22 are the same as those of the first exemplary embodiment, and detailed descriptions thereof will be omitted.

(Third Exemplary Embodiment)

Figure 9:
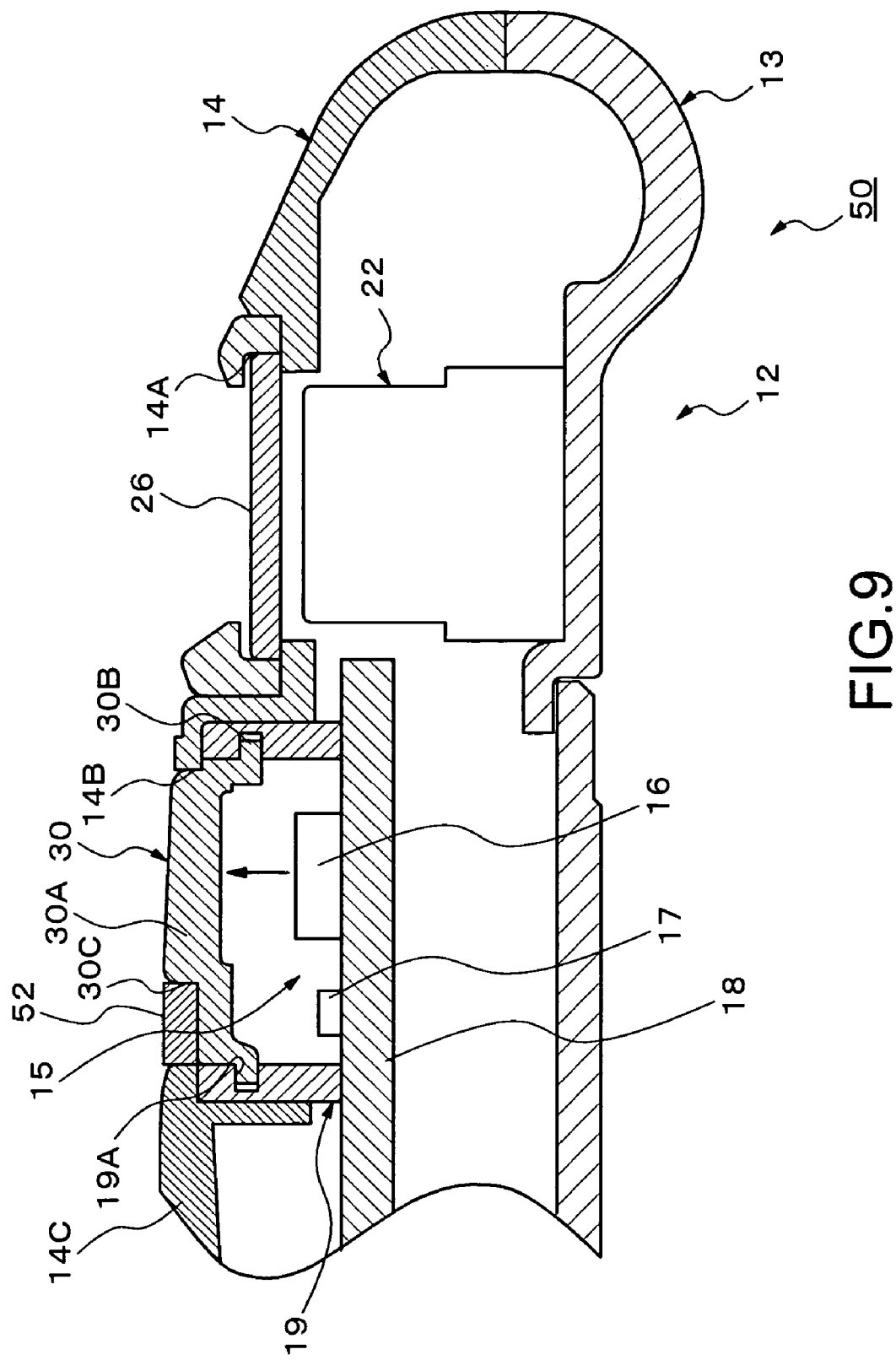
FIG. 9 is a cross-sectional view showing a main portion of a light source unit according to a third exemplary embodiment of the present invention.

In FIG. 9, a third exemplary embodiment of the present invention is shown. As to a structure of a mobile terminal 50 in this exemplary embodiment, portions in FIG. 9 which correspond to those in FIG. 3 are denoted by the same reference numerals, and detailed descriptions thereof will be omitted. The mobile terminal 50 in this exemplary embodiment is an example in which a light-blocking plate (light-blocking means) 52 is fit into the step portion 30C of the lens 30, the light-blocking plate being formed of a piece different from the second case 14. Moreover, the light-blocking plate 52 has the same level surface as the lens portion 30A of the lens 30.

Note that, in the lens 30 in the above exemplary embodiments, instead of providing the step portion 30C, a member (a tape, for example) for blocking light may be affixed to a section facing the second light source 17. Other structures, and other operation effects regarding the light source unit 15 and the camera unit 22 are the same as those of the first exemplary embodiment, and detailed descriptions thereof will be omitted.

Additionally, combined patterns in the present invention may be patterns obtained by combining two examples, or two or more examples, among the above respective exemplary embodiments or modified examples thereof. Furthermore, an electric apparatus according to the present invention is a notion including, in addition to a mobile terminal as shown in each of the above exemplary embodiments, a personal computer, personal digital assistants (PDAs) and the like.

Further, it is noted that the inventor's intent is to retain all equivalents of the claimed invention even if the claims are amended during prosecution.

What is claimed is:

1. A light emitting device, comprising:
a first light source that emits first light;
a second light source that emits second light;

a single lens arranged toward a light emitting side of the first and second light sources, the single lens having a transmitting region;

a housing portion housing the first and second light sources, the housing portion further supporting the single lens; and a light-blocking portion arranged to be contiguous to the single lens and being set facing the light emitting side of said second light source;

wherein light from the second light source is transmitted directly to the transmitting region of the single lens.

2. The light emitting device according to claim 1, further comprising:

a step portion provided on the single lens; and a member of the light-blocking portion arranged in a manner that it overlaps the step portion of the single lens.

3. The light emitting device according to claim 1, wherein the first light source is provided as a white light emitting diode, and wherein the second light source is provided as a light emitting diode whose light volume is different from a light volume of the white light emitting diode.

4. The emitting device according to claim 1, wherein a light emitting surface of the first light source is arranged nearer to the transmitting region of the single lens than a light emitting surface of the second light source.

5. An electronic apparatus, comprising:

a camera arranged in a main body of the apparatus, the camera picking up an image of a subject;

a first light source that emits first light in conjunction with a flash of the camera;

a second light source that emits second light for indicating status regarding various functions;

a single lens arranged toward a light emitting side of the first and second light sources, the single lens having a transmitting region;

a light-blocking portion arranged to be contiguous to the single lens and being set facing the light emitting side of said second light source; and a housing portion housing the first and second light sources, the housing portion further supporting the single lens, wherein light from the second light source is transmitted directly to the transmitting region of the single lens.

6. The electronic apparatus according to claim 5, wherein the first light source is provided as a white light emitting diode, and wherein the second light source is provided as a light emitting diode whose light volume is smaller than a light volume of the white light emitting diode.

7. The electronic apparatus according to claim 5, wherein the single lens and the camera are arranged in order to bring about a state where, when the main body of the apparatus is held, the single lens is positioned above the camera.

8. The electronic apparatus according to claim 5, further comprising:

a step portion provided on the single lens; and a member of the light-blocking portion arranged in a manner that the member of the light-blocking portion overlaps the step portion of the single lens.

9. The electronic apparatus according to claim 5, wherein the second light source is arranged in order that light from the second light source is transmitted toward an edge portion of the main body of the apparatus.

10. A electronic apparatus, comprising:

a first housing provided with a camera that picks up an image of a subject;

a second housing attached to the first housing through an open/close means;

a first light source that emits first light in conjunction with a flash of the camera;

a second light source that emits second light for indicating status regarding various functions;

a single lens arranged toward a light emitting side of the first and the second light sources, the single lens having a transmitting portion;

a light-blocking portion arranged to be contiguous to the single lens and being set facing the light emitting side of said second light source; and a housing portion housing the first and second light sources, the housing portion further supporting the single lens, wherein light from the second light source is transmitted directly to the transmitting region of the single lens.

11. The electronic apparatus according to claim 10, further comprising:

a step portion provided on the single lens; and a member of the light-blocking portion arranged in a manner that the member of the light-blocking portion overlaps the step portion of the single lens.

12. The electronic apparatus according to claim 10, wherein the second light source is arranged in order that light from the second light source is transmitted toward an edge portion of the main body of the first housing.

13. The electronic apparatus according to claim 10, wherein the first light source is provided as a white light emitting diode which emits light when the camera picks up an image, and wherein the second light source is provides as a light emitting diode whose light volume is smaller than a light volume of the white light emitting diode.

14. The electronic apparatus according to claim 10, wherein the single lens is arranged in order that, when the main body of the apparatus is held, a state can be such that the single lens is positioned above the camera.

* * * * *